Aug. 2, 1955

A. G. SELLERS 2,714,501

FUEL INJECTOR FOR INTERNAL COMBUSTION ENGINES

Filed May 24, 1952

INVENTOR
ARTHUR G. SELLERS
BY
Webster & Webster
ATTY'S.

Aug. 2, 1955  A. G. SELLERS  2,714,501
FUEL INJECTOR FOR INTERNAL COMBUSTION ENGINES
Filed May 24, 1952  3 Sheets-Sheet 2

INVENTOR
ARTHUR G. SELLERS
BY
Webster & Webster
ATTYS.

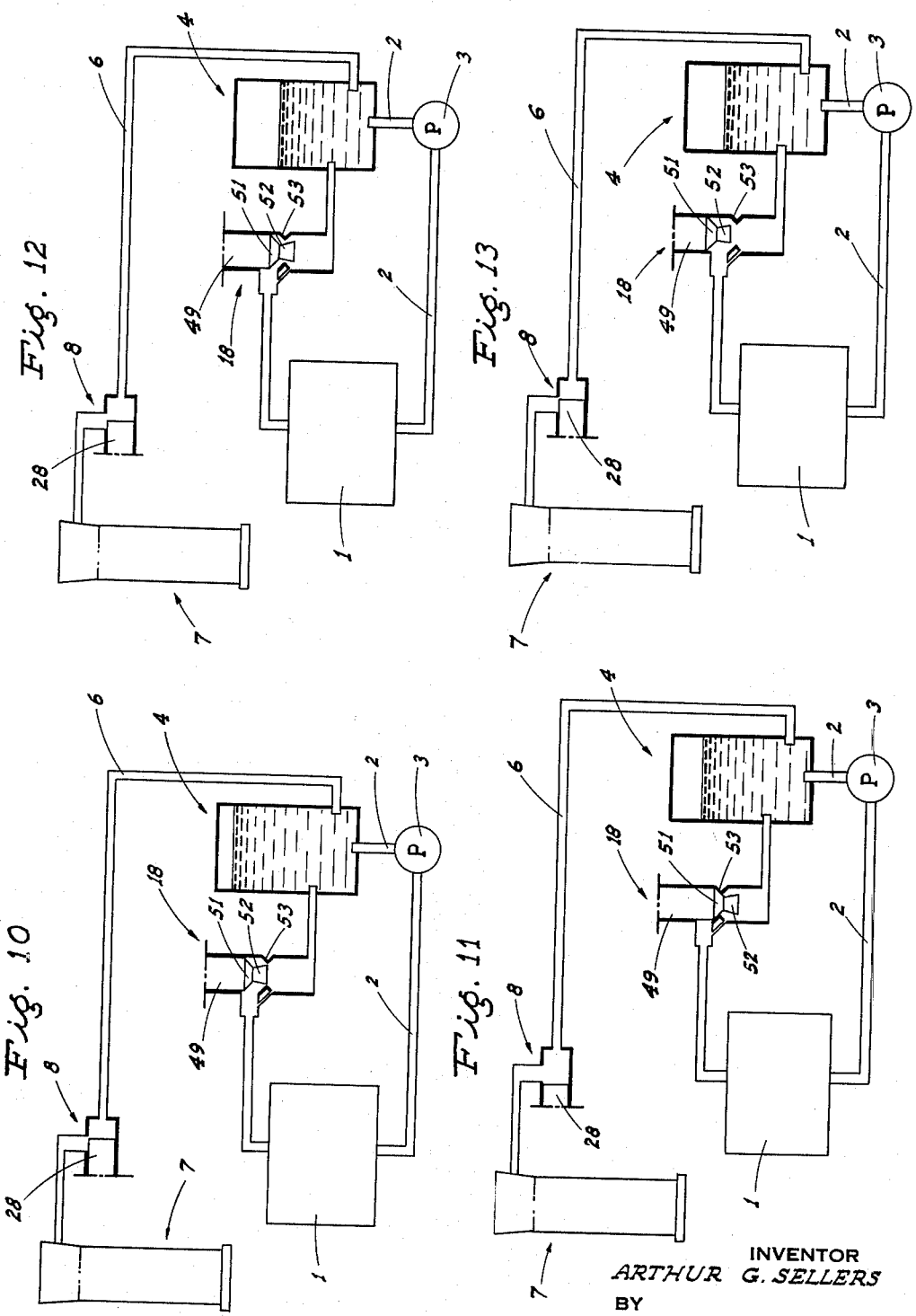

United States Patent Office 2,714,501
Patented Aug. 2, 1955

2,714,501

FUEL INJECTOR FOR INTERNAL COMBUSTION ENGINES

Arthur G. Sellers, Stockton, Calif., assignor of one-half to Walter H. Ireland, Manteca, Calif.

Application May 24, 1952, Serial No. 289,841

2 Claims. (Cl. 261—36)

The present invention is directed to, and it is a major object to provide, a fuel feed system, for internal combustion engines, of novel construction and function; the device being operative to deliver fuel to the engine by injection pressure as distinguished from conventional carburetion.

Another important object of this invention is to provide a fuel feed system which comprises a novel combination of a constant pressure fuel pump, a pressure regulating valve unit, a metering valve unit, and a carburetor unit; the pressure regulating valve unit acting to regulate the pressure at which the pump delivers fuel through the metering valve unit to the injector unit.

An additional object of the invention is to provide a fuel feed system, as in the preceding paragraph, wherein the pressure regulating valve unit works in direct response to the intake manifold pressure of the engine whereby fuel is effectively delivered to the engine in a quantity properly proportioned to load or atmospheric conditions, and to thus automatically avoid operation of the engine with a too rich or out-of-balance fuel-air mixture.

Another object of the instant invention is to provide a system of the type described which includes a surge chamber between the pump and pressure regulating valve unit, so as to damp the pulsations of the pump and assure of an even flow of fuel in the system.

Other objects of the invention are to provide a system which is not subject to centrifugal force or float operation, as in a conventional carburetor; which effectively atomizes the fuel before its introduction into the engine; which increases engine efficiency, resulting in more miles per gallon of fuel; which is simple in structure and convenient to service; and which automatically compensates—in the fuel mixture—for engine wear.

It is also an object of the invention to provide a system which is designed for ease and economy of manufacture and convenience of installation.

A still further object of the invention is to provide a practical and reliable fuel injector, and one which will be exceedingly effective for the purpose for which it is designed.

These objects are accomplished by means of such structure and relative arrangement of parts as will fully appear by a perusal of the following specification and claims.

Figs. 10–13, inclusive, are diagrammatic illustrations showing the relative working positions of the parts under varied load or operating conditions.

Figure 1:
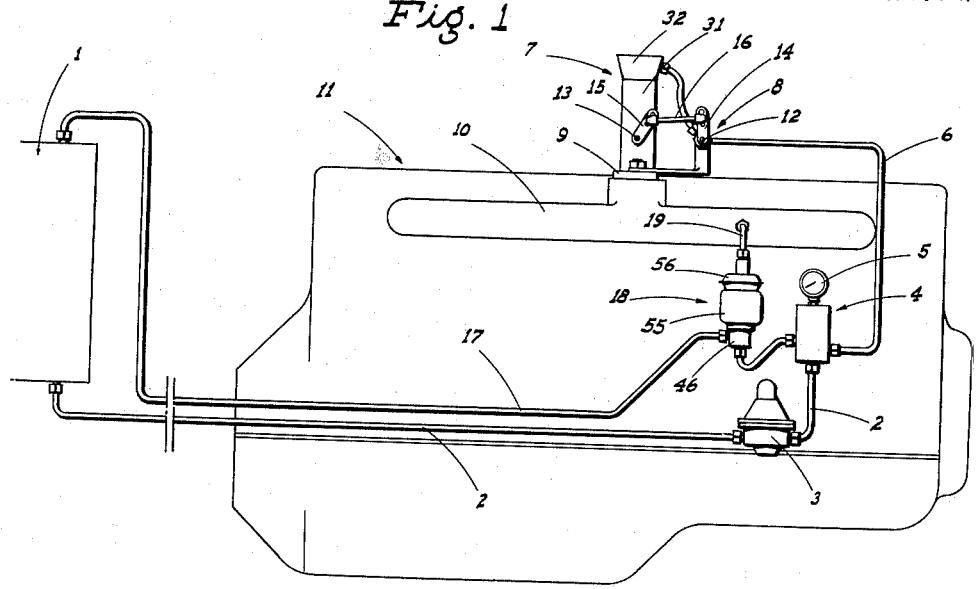
Fig. 1 is a somewhat diagrammatic elevation of the fuel injector system as applied to an internal combustion engine.

Referring now more particularly to the characters of reference on the drawings, and particularly at present to Fig. 1 wherein the device or system is shown in complete assembly, the numeral 1 indicates the fuel tank of the vehicle, and a fuel supply conduit 2 leads from the bottom of such tank.

An engine driven, constant pressure fuel pump 3, which may be of substantially conventional lever and diaphragm type, is interposed in the fuel supply conduit 2 intermediate its ends.

Beyond the pump 3 the fuel supply conduit 2 connects to the bottom of a surge chamber, indicated generally at 4, which surge chamber includes a gauge 5 at the top; it being understood that this gauge, in actual practice may be mounted on the instrument panel of the vehicle, with a suitable interconnecting conduit.

A fuel feed conduit 6 leads from the surge chamber 4 on one side adjacent the bottom, and extends to a carburetor unit 7, a metering valve unit 8 being interposed in said conduit 6 intermediate its ends.

The carburetor unit 7 is secured at its lower end by an attachment flange 9 to the intake manifold 10 of the engine; the latter being indicated generally at 11.

The metering valve unit 8 includes a control shaft 12, while the carburetor unit includes a butterfly valve supporting shaft 13; the shafts 12 and 13 being parallel and having upstanding lever arms 14 and 15 thereon, with said lever arms connected together, for operation in unison, by means of a link 16.

The usual foot pedal controlled, accelerator linkage (not shown) of the vehicle connects to either the lever arm 14 or 15 for the purpose of causing simultaneous actuation of said arms and the related units which they control; to-wit, the carburetor unit 7 and metering valve unit 8.

A fuel return conduit 17 leads from the surge chamber 4 opposite the conduit 6 and extends to connection with the fuel tank 1 at the top; a pressure regulating and by-pass valve unit 18 being interposed in the fuel return conduit 17 intermediate its ends. The pressure regulating valve unit 18 has a connection, for the purpose hereinafter described, with the intake manifold 10 by means of a conduit 19.

Figure 6:
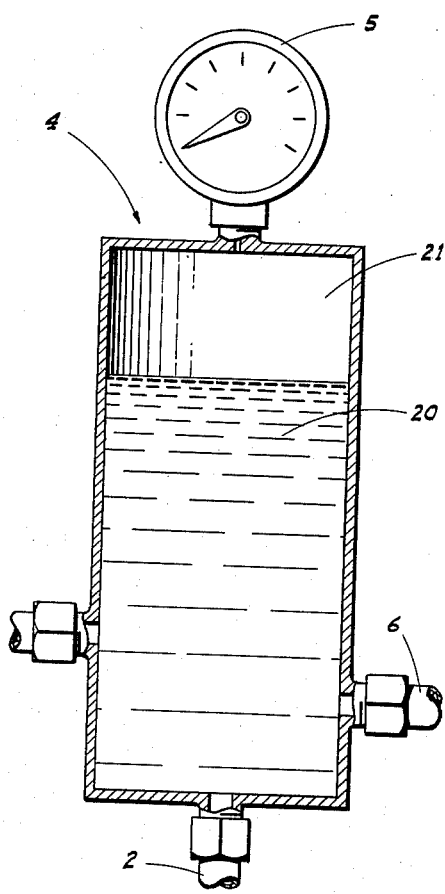
Fig. 6 is an enlarged sectional elevation of the surge chamber.
Figure 8:
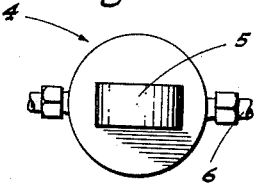
Fig. 8 is a top plan view, on reduced scale, of the surge chamber shown in Fig. 6.

The surge chamber 4, as shown in detail in Figs. 6 and 8, receives a quantity of fuel 20 therein from the pump 3; such quantity of fuel working upwardly against an air dome 21 in the chamber, whereby to damp the impulses of such pump.

Figure 9:
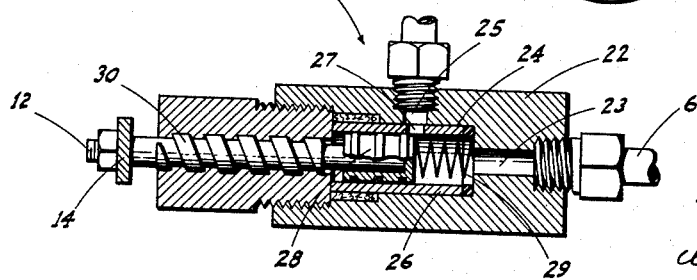
Fig. 9 is an enlarged sectional elevation of the metering valve unit.

The amount of fuel under pressure which may deliver through the conduit 6 to the fuel injector unit 7 is controlled by the metering valve unit 8 which is constructed in the manner shown in detail in Fig. 9.

Such metering valve unit 8 comprises a valve body assembly 22 having a longitudinal passage 23 communicating with an enlarged longitudinal bore 24; there being a lateral passage 25 in communication with said bore 24. The conduit 6 is split, intermediate its ends, and by suitable fittings—as shown—is connected at adjacent ends to the passages 23 and 25.

Within the bore 24 there is a liner sleeve 26 suitably sealed and formed with a valve port 27 which opens to the lateral passage 25.

A plunger valve 28 works in the sleeve 26, being movable in valve closing and opening relation to the port 27. A compression spring 29 urges the plunger valve 28 in an opening direction, and said plunger valve is moved in a closing direction by a fast acting screw 30 threaded axially in the body at the end opposite the passage 23. The screw 30 is formed on an intermediate portion of the shaft 12, and on which shaft the lever arm 14 is attached.

The extent of opening or closing of the metering valve unit 8 is thus dependent on the position of the lever arm 14; the arrangement being such that as said lever arm 14 is swung in a valve opening direction, the lever arm 15 rotates the shaft 13 in a butterfly opening direction.

The butterfly valve and its relation in the carburetor unit 7 is hereinafter described.

Figure 2:
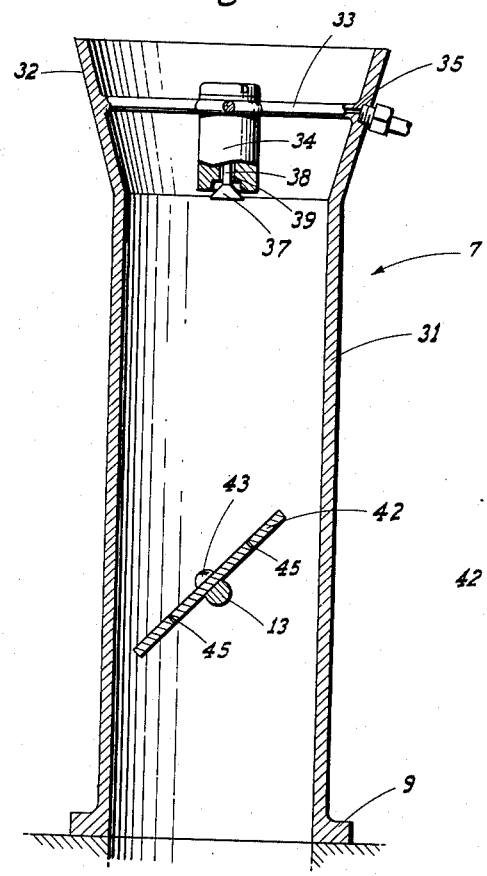
Fig. 2 is an enlarged sectional elevation showing the carburetor unit.
Figure 3:
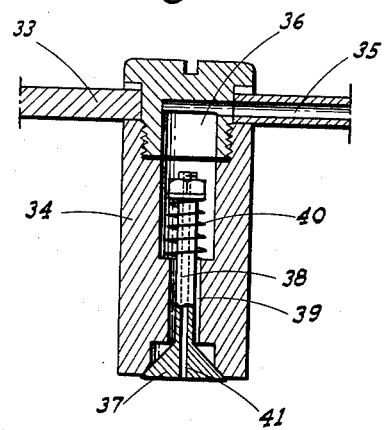
Fig. 3 is an enlarged fragmentary sectional elevation showing the fuel discharge nozzle of said carburetor unit.
Figure 4:
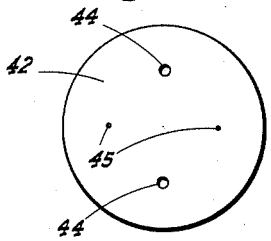
Fig. 4 is a plan view of the butterfly valve, detached.

The carburetor unit 7, as shown in detail in Figs. 2 and 3, comprises a vertical elongated intake throat or sleeve 31, attached by the flange 9 to the intake manifold 10, as aforesaid.

At its upper end portion, which is flared outwardly, as at 32, the intake sleeve 31 is formed therein with a spider 33 which carries, at the hub, a downwardly projecting, fuel discharge nozzle 34. The fuel feed conduit 6 communicates with a bore 35 which extends through one of the legs of the spider 33; such bore discharging into an internal chamber 36 of the nozzle 34.

At its lower end the nozzle 34 carries a downwardly opening check valve 37, of conical type, which tends to close upwardly against the included seat, and such valve includes an upstanding stem 38 which runs through a fluted bore 39 in the nozzle 34; the return spring being indicated at 40, and which spring is disposed in the chamber 36.

Under the influence of fuel under pressure in the chamber 36, together with suction in the intake sleeve 31, the check valve 37 opens downwardly for fuel admission into said sleeve.

The stem 38 includes an axial bore or bleed passage 41 therethrough for idling fuel supply.

When the conical check valve is open, fuel—under pressure—discharging from the nozzle 38 is deflected by said valve in atomized condition into the down-surge of air entering the sleeve 31 from above. Below the nozzle 34 the fuel injector unit 7 includes a butterfly valve 42 attached to the cross shaft 13 by screws 43 passing through screw holes 44 in the butterfly valve; the latter having small idler ports 45 therethrough.

Fuel under pressure from the pump 3, flowing evenly by reason of the inclusion of the surge chamber 4, may thus be fed in metered quantity by the valve unit 8 and carburetor unit 7 into the engine 11 for operation of the latter.

While the metering valve unit 8 is set to work in unison with the butterfly valve 42, whereby to give a broadly proportioned fuel-air mixture, it is desirable that such mixture be under more accurate control for different load and atmospheric conditions, and this is accomplished by proportionately varying the fuel pressure in the conduit 6, dependent on such conditions. This is accomplished by the use of the pressure regulating valve unit 18 which is responsive to pressure conditions in the intake manifold 10, and which pressure conditions are dependent on load, or atmospherics.

Figure 5:
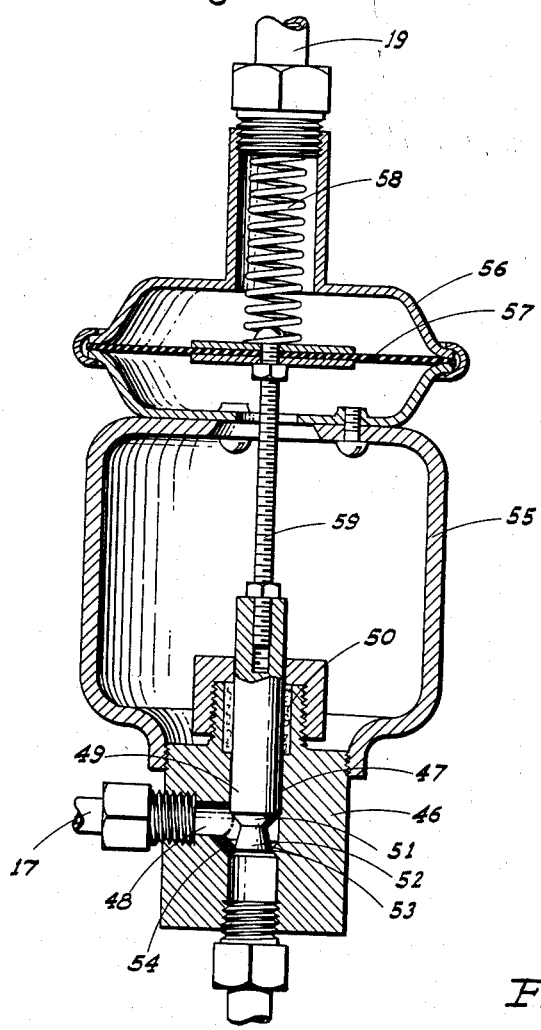
Fig. 5 is an enlarged sectional elevation showing the pressure regulating valve unit.
Figure 7:
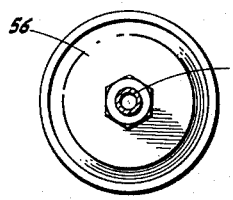
Fig. 7 is a top plan view, on reduced scale, of the pressure regulating valve unit shown in Fig. 5.

The pressure regulating valve unit which serves as a bypass of fuel under pressure is constructed in the manner shown in detail in Figs. 5 and 7.

The pressure regulating valve unit 18 comprises a valve body 46 having a vertical bore 47 therethrough, with a lateral passage 48 opening into such bore intermediate its ends.

The fuel return conduit 17 is split intermediate its ends, and the delivery end connects with the lower portion of the bore 47 by a suitable fitting, while the other end connects with the lateral passage 48 likewise by a suitable fitting.

A valve stem 49 is slidable in the bore 47 below a suitable packing gland 50, and at its lower end portion said stem 49 is formed with a downwardly tapering valve face 51, and therebelow an upwardly tapering valve face 52.

Upon downward travel of the valve stem 49, the valve face 51 moves toward and finally engages an annular seat 53 in the bore 47 below the lateral passage 48, while on upward motion of the valve stem 47, the upwardly tapered valve face 52 works first in plug-like, progressively flow restricting relation to the seat 53, and then passes closely through the latter and continues upward to a raised open position.

A bleed duct 54 connects diagonally between the bore 47 below the valve assembly and the lateral passage 48 outwardly of such assembly; said bleed duct 54 being to prevent any excessive pressure build up in the system and to permit such excess to bleed back to the fuel tank 1; this being especially desirable when the engine is stopped and flooding of the injector system might otherwise occur.

The valve stem 49, and the above described valve assembly, including the valve faces 51 and 52, is worked in response to the vacuum in the intake manifold 10 as follows:

A cylindrical cage 55 upstands from the valve body 46 and supports a diaphragm type actuator 56 in fixed position thereon. The actuator 56 includes a flexible diaphragm 57 urged downwardly by a spring 58, and urged upwardly by vacuum imposed on said actuator 56 from the intake manifold 10 through the conduit 19.

An adjustable rod 59 extends downwardly from the diaphragm 57 and connects to the upper end of the valve stem 49 in the cage 5.

The function of the pressure regulating valve unit 18, above described, will hereinafter appear; it being generally understood that such valve unit is for the purpose of bypassing a regulated amount of the fuel under pressure from the surge chamber 4 back to the fuel tank 1 under operating conditions where a leaner fuel mixture is desired; such leaner mixture resulting from the reduction of fuel pressure at the metering valve unit 8.

Immediately before starting the engine there is no vacuum in the intake manifold 10, with the consequence that the actuator 56, under the influence of the spring 59, closes the valve face 51 downwardly against the seat 53. This prevents any bypassing of the fuel to the tank 1 by the pressure regulating valve unit 18, and the full pressure from the pump 3 and surge chamber 4 is thus available at the metering valve unit 8 for a quick start of the engine, and at which time said metering valve unit 8 is relatively wide open; i. e. the accelerator pedal is depressed.

The relative position of the parts of the system, at such time, is illustrated in the diagram of Fig. 11, which diagram also is representative of the position of the parts upon maximum acceleration or full throttle.

In other words, it is desirable that maximum fuel pressure be delivered to the metering valve unit for starting, and for full acceleration when running.

When the engine is idling the parts occupy the position shown in the diagram of Fig. 10. With the engine idling, with consequent high manifold vacuum, the actuator 56 works to substantially close the taper valve face 52 in relation to the annular seat 53; it being desirable that no substantial bypassing of the fuel back to the fuel tank 1 occur when the engine is idling, as fuel starving of the engine could otherwise result.

When the accelerator pedal is depressed to cause simultaneous part-opening of the butterfly valve 42 and metering valve unit 8, the resultant lowering of the vacuum in the intake manifold 10 permits the actuator 56, under the influence of the spring 58, to shift the valve stem 49 to an intermediate valve position; i. e. with the valve faces 51 and 52 disposed with the seat 53 at a point therebetween.

With the pressure regulating valve unit 18 in such position, as reflected in the diagram of Fig. 12, there is a partial bypassing of the fuel under pressure to the fuel tank 8, reducing the pressure in the conduit 6 available to the metering valve unit 8. The result is that the engine, at normal running speed, is not fed a too-rich fuel-air mixture, as is desirable for fuel economy and better engine operation.

It is contemplated that the linkage connection 16 between the lever arms 14 and 15 will be such that the metering valve unit 8 opens slightly ahead of the butterfly valve 42 of the fuel injector 7, as they both move into an increasing load position.

A further feature of advantage can be provided by employing a link 16 which is expansible under conditions of heat, whereby to compensate for cold and hot engine operation; the link 16 under such circumstance being hooded so that it may be heated from the exhaust manifold.

When the engine is operating with the vehicle decelerating in gear, coasting down-hill, or the like, the vacuum in the manifold reaches a maximum, so that the actuator 56 lifts the valve stem 49 upwardly a distance so that the valve faces 51 and 52 are both above the seat 53, as shown in the diagram of Fig. 13. This permits of a considerable relief or bypassing of the fuel under pressure, causing the mixture delivered to the engine by the metering valve unit 8 and carburetor unit 7 to be considerably lesser, again a desirable and fuel conserving feature.

The pressure regulating valve unit 18 also compensates for changes in atmospheric pressure caused by altitude or weather. With the engine receiving less air at a higher altitude, for example, the engine revolutions per minute decrease, resulting in a lower vacuum in the manifold 10. This drop in vacuum works the pressure regulating valve unit 18 in a manner to permit of slight lowering of the valve stem 49, which lowering—when in a running position as in Fig. 12—affords an increase in the bypassing fuel under pressure. This in turn lowers the fuel pressure at the metering valve unit 8, and thereby maintains a properly proportioned air-fuel ratio for higher altitude operation.

The pressure regulating valve unit 18 additionally serves the purpose of adjusting the air-fuel ratio proportionate to engine wear. As the engine wears through usage, the valve and ring clearance increases and manifold vacuum reduces.

With reduction in manifold vacuum, the actuator 56 works the valve stem 49 in a manner to slightly increase the by-passing fuel, proportionately reducing fuel pressure at the metering valve unit 8, whereby less fuel is injected into the engine, and the air-fuel mixture ratio is maintained.

The described invention provides a most effective, practical, and reliable fuel injection system for internal combustion engines, and a system which functions automatically to maintain the correct air-fuel mixture under varying conditions of load, atmospherics, etc.

From the foregoing description it will be readily seen that there has been provided such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired.

1. A fuel injector, for an internal combustion engine, comprising a fuel tank, a carburetor unit arranged for communication with the intake manifold of an engine, a fuel conduit system connected between the tank and the carburetor unit, a pump interposed in said conduit system, and an operator controlled metering valve unit interposed in said conduit system between the pump and said carburetor unit; the latter comprising an elongated intake sleeve, a butterfly type throttle valve in the intake sleeve intermediate its ends, means linking the throttle valve and metering valve unit for actuation in unison, a mounting spider in the sleeve toward its outer end from the throttle valve, a fuel discharge nozzle secured centrally on the spider and facing the throttle valve and means connecting the fuel conduit system with the interior of the nozzle; the nozzle including a body having an internal chamber and a bore extending from said chamber to the discharge end of the nozzle, and said bore having a longitudinally fluted portion; and a check valve adapted to open in the direction of the throttle valve, the check valve comprising a stem slidable in the fluted portion of the bore, a conical valve on the outer end of the stem adapted to engage a seat on the body, the bore opening through the seat, and a spring in the chamber yieldably urging the stem axially inwardly.

2. A fuel injector for an internal combustion engine comprising a fuel tank, a carburetor unit arranged for communication with the intake manifold of an engine, a fuel conduit system connecting the tank and the carburetor unit, a pump interposed in the conduit system, an operator-controlled metering valve unit interposed in the conduit system between the pump and the carburetor unit, a fuel return conduit connected to said conduit system beyond the pump and thence leading to the tank, and an adjustable pressure regulating valve unit interposed in said return conduit and including a vacuum responsive actuator, there being a separate conduit arranged for connection between the actuator and an engine manifold; the pressure regulating valve unit embodying a valve assembly having a body formed with a bore, an axially slidable valve stem in the bore, the actuator being connected to the stem in operative relation, the bore having an annular valve seat therein, and valve means on the stem adapted to cooperate with said seat; such valve means including adjacent but opposed tapered valve faces, one being adapted to work to and from engagement with the seat, and the other being adapted to work through the seat between relatively open positions on either side thereof or a relatively closed position within said seat.

References Cited in the file of this patent

UNITED STATES PATENTS

| | | |
|---|---|---|
| 1,662,040 | Lee | Mar. 6, 1928 |
| 1,881,860 | Muzzy | Oct. 11, 1932 |
| 2,064,217 | Ravanelli | Dec. 15, 1936 |
| 2,121,506 | Mennesson | June 21, 1938 |
| 2,136,959 | Winfield | Nov. 15, 1938 |
| 2,499,554 | Wirth | Mar. 7, 1950 |
| 2,562,656 | Blakeslee | July 31, 1951 |
| 2,574,670 | Sweeney | Nov. 13, 1951 |
| 2,646,976 | Saaty | July 28, 1953 |